(12) United States Patent
Walker et al.

(10) Patent No.: US 6,232,989 B1
(45) Date of Patent: May 15, 2001

(54) DATA AUGMENTATION SYSTEM AND METHOD

(75) Inventors: Chris Walker, Venice; Babak Beheshti, Santa Monica, both of CA (US)

(73) Assignee: Modern Cartoons, Ltd., Venice, CA (US)

( * ) Notice: Subject to any disclaimer, the term of this patent is extended or adjusted under 35 U.S.C. 154(b) by 0 days.

(21) Appl. No.: 09/066,720

(22) Filed: Apr. 23, 1998

Related U.S. Application Data
(60) Provisional application No. 60/044,608, filed on Apr. 24, 1997.

(51) Int. Cl.[7] .............................. G09G 5/08; G06T 13/00; G06T 15/70
(52) U.S. Cl. ......................... 345/474; 345/473; 345/161
(58) Field of Search .................................. 345/474, 473, 345/161, 949, 957; 370/503

(56) References Cited

U.S. PATENT DOCUMENTS 5,818,462 * 10/1998 Marks et al. .......................... 345/473
5,995,518 * 11/1999 Burns et al. .......................... 370/503
6,031,549 * 2/2000 Hayes-Roth .......................... 345/474

* cited by examiner

Primary Examiner—Bipin Shalwala
Assistant Examiner—David L. Lewis
(74) Attorney, Agent, or Firm—Cislo & Thomas LLP

(57) ABSTRACT

A system and method for augmenting data and for integrating the augmented data into a program running on a computer system is provided. The invented system couples to a data collection computer along with data generating equipment, such as a body suit, for augmenting data generated thereby. Augmentation data generated by the system and body movement data generated by the suit is simultaneously transmitted to the computer containing a data base defining a virtual world. As the suit generates movement data and transmits the data to the computer for controlling the movements of an object in the virtual world, an operator of the system monitors the data generated by the equipment and activates the system to selectively augment data generated thereby, for enhancing the movements of the character. The invented system transmits the augmentation data to the data collection computer to augment the data generated by the equipment so that the character, has exaggerated movements or cartoonish features. Additionally, the system and method of the present invention augments the data generated by the data generating device without overwriting the data generated thereby, so that the exaggerated movements of the character can continuously track the movements indicated by the data generating equipment.

15 Claims, 4 Drawing Sheets

DATA AUGMENTATION SYSTEM AND METHOD

RELATED APPLICATION

This application is a continuation-in-part of U.S. Provisional patent Application Ser. No. 60/044,608 filed Apr. 24, 1997.

BACKGROUND OF THE INVENTION

1. Field of the Invention

The present invention relates generally to computer data input and data manipulation devices, and more particularly, to a system and method for augmenting data generated by peripheral devices and for integrating the augmented data into a program running on a computer system.

2. Description of Related Art

Virtual reality systems are computer based systems that provide the experience to a participant of acting in a simulated environment that forms a three dimensional virtual world. These systems are used in several different applications such as commercial flight simulators, surgical training systems, and entertainment systems including computer games and video arcade games to name a few.

In virtual reality systems, the participant often wears a head-mounted device that enables viewing of a virtual reality world generated by the computer. The system also includes means for interacting with the virtual world, such as known data generation or manipulation devices. The data manipulation devices include known pointing devices, such as joysticks, or specially configured gloves that contain sensors and actuators, for interacting with objects in the virtual world. Additionally, a data generating body suit may be provided to enable the user to influence and to feel objects in the virtual world.

Computer generated animation is an increasingly prevalent media form. Computer generated animation is presently being used in such applications as full-length motion pictures, crime reenactments, short length films, television commercials, and children's cartoons. An expeditious method of creating computer generated animation comprises providing actors with all, or some, of the virtual reality equipment previously discussed, so that the wearer of the equipment can control the movements of a character in the animation, so that the character can act out scenes in the animation as directed. Since a director of the computer animation can view and direct the actions of an actor wearing the equipment as they are performing, the director can make any desired changes to the actions of the actor as they are performing to obtain the desired scene. Thus, the director can control the actions of the character as a scene is being performed, for generating the computer animation in real time.

It is known that virtual reality systems include a computer that processes data generated by the equipment worn on the actor for controlling the movements of an object, such as a character for example, in a computer animation. A disadvantage of known virtual reality systems, is that the data generated by the equipment and processed by the computer only enables the character controlled by the system to mimic the movements of the actor. Thus, if it is desired for the character to have exaggerated features or movements, such as facial expressions, the character controlled by the actor must first be created, or mapped, by the system with the desired exaggerated features.

A disadvantage of mapping exaggerated features to obtain the desired appearance of the character, is that the character's appearance is permanently altered with the exaggerated features. Thus, the character is no longer has a normal appearance if desired. Therefore, a substantial disadvantage of prior art virtual reality systems, many of which are used for creating computer generated animation, is that means are not provided for augmenting the data generated by the equipment and processed by the system to control the virtual reality character. Therefore, it would be advantageous to provide a virtual reality system that augments data generated by the equipment thereof, for temporarily enhancing the movements or features of a character controller by the system.

A prior art virtual reality system is disclosed in U.S. Pat. No. 5,515,078, to Greschler et al. Disclosed therein is a system for receiving positional information and displaying a virtual world based on the positional information. The system includes a base and a chair with an attached monitor that may be rotated with respect to the base by the user of the system. A measuring device determines the rotational position of the chair. The system includes joysticks that have bases attached to the chair or the monitor so that they move with the chair. Data from the joysticks and from the measuring device are sent to a processor, which accesses a data base defining a virtual world and generates an image on the monitor. The monitor image represents apparent movement within and through the virtual world represented by the databases.

Devices have been provided in the prior art that measure the relative position and orientation of a body in space, then transmit relative data to a computer for processing the data. These devices may include a body suit that has a number of sensors, or receivers, for determining the position of the body in space. One such device is disclosed in U.S. Pat. No. 4,945,305, to Blood. The device disclosed therein quantitatively measures the position of receiver antennae relative to transmitter antennae. The device includes transmitter antennae consisting of a two or three axis aparallel transmitter antennae that generates at least two DC magnetic vectors. A pulsed DC signal sequentially supplies the aparallel antennae with DC pules to drive the antennae, to generate the DC magnetic vectors. A like number of aparallel receiver antennae are provided to detect the DC magnetic vectors.

The number of transmitter antennae multiplied by the number of receiver antennae is at least equal to the number of degrees of freedom of the desired quantitative measurement of the position of the receiver antenna relative to the transmitter antennae. Means for compensating for the effects of the earth's magnetic field on the operation of the device are also provided. Additionally included are signal processing means to ascertain the magnitude of the detected DC magnetic vectors and to quantitatively compute the relative position and orientation of the receiver antennae relative to the transmitter antennae.

Although the devices disclosed in the above enumerated prior art references have improved features, there still exists a need for a vitual reality system that augments data generated by the equipment thereof for temporarily enhancing the movements or features of a character controller by the system.

OBJECTS OF THE INVENTION

It is therefore an object of the present invention to provide a system and method for augmenting data generated by virtual reality equipment;

It is another object of the present invention to provide a system and method for augmenting data generated by virtual reality equipment thereof and for integrating the augmented data into a into a program running on a computer system for altering the program;

It is another object of the present invention to provide a system and method for augmenting data generated by virtual reality equipment for temporarily enhancing the movements and features of a character controller by the system; and It is another object of the present invention to provide a system and method for augmenting data generated by virtual reality equipment for enhancing the movements and features of a character controller by the system and which enables the enhanced movements and features of the character to mimic the movements of a wearer of the virtual reality equipment.

SUMMARY OF THE INVENTION

These and other objects and advantages of the present invention are achieved by providing a system and method for augmenting data and for integrating the augmented data into a program running on a computer system. The system of the present invention couples to a data collection computer along with data generating equipment, such as a data generating body suit, for augmenting data generated by the equipment. Augmentation data generated by the invented system and body movement data generated by the body suit can be simultaneously transmitted to the data collection computer which may contain a data base defining a virtual world.

As the body suit generates movement data and transmits the data to the data collection computer for controlling the movements of an object, a character in the virtual world for example, an operator of the invented system monitors the data generated by the equipment and activates the system to selectively augment data generated thereby, for enhancing the movements of the character. The invented system transmits the augmentation data to the data collection computer to augment the data generated by the equipment so that the character has exaggerated movements or cartoonish features. Additionally, the system and method of the present invention augments the data generated by the data generating device without overwriting the data generated thereby, so that the exaggerated movements of the character can continuously track the movements indicated by the data generating equipment, if desired.

For example, if a wearer of a particular piece of data generating equipment such as a head set smiles, the invented system can remain inactive, so that the character in the virtual world may have a smile substantially similar to the wearer. However, if the operator of the invented system desires to augment the smile of the character, the operator activates the system for transmitting augmentation data to the data collection computer simultaneously with the movement data indicating the wearer's smile. The augmentation data can enhance the movement data, so that the character has a substantially larger smile, such as a cartoonish grin, for a selected time period. When it is desired to have the character again track the wearer's expressions, the operator can reduce or cease transmission of augmentation data, so that the character has expressions that are again analogous to the wearer's expressions.

In the preferred embodiment of the present invention, the system comprises an interface module coupled to the data collection computer and to peripheral data generating devices that may include specially configured joysticks that are provided with electronic circuitry that generates control signals upon activation by the operator, for achieving desired data augmentation. The circuitry includes a plurality of control means that output control signals to provide such functions as calibrating the data generating equipment, horizontal and vertical positioning, and means for augmenting the movement data generated by the equipment, such as controlling cartoonish or other special effects.

The circuitry of each of the peripheral devices also includes multiplexer means having an output coupled to the interface module for transmitting augmentation data to the data collection computer and a plurality of inputs, with an input coupled to each of the control means. The multiplexer means continuously checks its inputs for sensing signals generated by the control means coupled thereto, for determining activation thereof. Upon activation of any of the control means, the multiplexer means receives signals generated thereby and transmits the signals to the interface module, for transmitting augmentation data determined by the activated control means to the computer. Memory means may also be provided to retain information as to the different types of control means that the particular device embodies, and to determine which specific control means is coupled to each input of the multiplexer means.

In the present invention, the interface module is coupled between the peripheral devices and data collection computer for receiving signals generated by the devices and for transmitting augmentation data to the computer. The module has a plurality of inputs for coupling the peripheral devices thereto. The inputs of the module are continuously checked for sensing signals generated by the control means of the peripheral devices. The interface module also includes a processor for controlling data flow therethrough. As control signals are received from the control means, the module first converts the signals to digital values, to prepare the signals for processing. Data indicating the control means that generated the control signals and its associated peripheral device are grouped with the digital values of the control signals and is transmitted to the data collection computer as augmentation data.

The interface module may also be provided with memory means for data storage. The memory means may include nonvolatile data storage means for storing information regarding the interconnections between each of the peripheral devices and the module, and volatile data storage means for storing augmentation data to be transmitted to the collection computer.

The groups of augmentation data are then transmitted to the data collection computer for processing. The collection computer performs processing on the augmentation data to prepare the data for integration into a program running on the computer. The augmentation data is prepared for integration into the program by first sorting the groups of augmentation data as they are received from the interface module, for determining the particular peripheral device and the control means thereof that produced the augmentation data. Augmentation data received from the interface module is continuously sorted, organized, and configured into data records for integrating the data into the program.

Augmentation data records are then integrated into a program, such as a virtual reality data base that defines a virtual world, running on the computer. The augmentation data enhances and may alter the movements of an object, such as a cartoon figure or character in the virtual world, so that the character is capable of having either somewhat normal movements or having augmented, or cartoonish, type movements and characteristics, as desired by the operator.

The method of the present invention preferably comprises initially activating the invented system. Upon initial activation of the system, the data collection computer transmits a request signal to the interface module to determine the number of peripheral data generating devices coupled thereto and the configuration of each of the different devices. Upon determining the number and configuration of the peripheral devices coupled thereto, the interface module transmits the configuration information to the data computer. Since each control means generates a specific type of control signal for generating augmentation data to augment a specific feature or enhance specific movements of the character, the configuration information communicates to the data collection computer the specific type of augmentation data generated by each control means.

Once the data collection computer receives the configuration information from the interface module, the computer is prepared to receive augmentation data therefrom, along with movement data output from the data generating equipment, such as a body suit, face movement tracking device, or both, or other and additional equipment.

As a wearer of the equipment begins moving about, the equipment begins generating movement data, indicating the wearer's movements. An operator of the invented system, which could be the wearer or another person, monitors the movements of the wearer. When desired, the operator actuates a selected control means of one of the peripheral devices to augment the desired feature. As discussed, the control means may be used to augment such functions as calibrating the data generating equipment, horizontal and vertical positioning, and means for augmenting the movement data generated by the equipment, such as controlling cartoonish or other special effects. The cartoon and special effects could include causing the character's eyes to pop out of their head, roll and unroll the tongue of the character, raise and lower their eyebrows, or any other desired facial expression or body movement desired.

If the operator desires to augment eyebrow movement of the wearer, for causing the eyebrow to move substantially upwardly on the wearer's face to give the character a cartoonish appearance for example, the operator actuates the predetermined control means for generating augmentation data to augment movement of the eyebrow. The control means may comprise a button or other type switch, for generating specific control signals upon activation thereof, for providing a predetermined enhancement of eyebrows movement. Alternatively, the button may comprise a variable output device, such as a potentiometer for instance, that is capable of generating output signals of varying amplitude, that are used to control the degree of augmentation of the augmented feature, such as the eyebrow. Thus, movement of the eyebrow, such as raising the eyebrow may be only slightly enhanced, moving the eyebrow upwardly on the character's forehead or may be enhanced greatly, moving the character's eyebrows completely off their head to give the character a cartoon appearance, or enhance the cartoonish appearance of the character.

The augmentation data is generated for a time period determined by the type of control means activated and collection computer or interface module, for example. If the activated control means comprises a momentary switch the activation time period thereof is preferably determined by either collection computer or interface module. When utilizing a variable output control means the activation time period thereof may be determined by the operator. The operator preferably is capable of determining the degree of augmentation of the selected feature, for adjusting the augmentation of the feature from null augmentation to fill augmentation, as desired. As the augmentation data generated by activated the control means is transmitted to the collection computer, the movement data generated by the equipment is simultaneously transmitted to the computer for integrated the data simultaneously for altering the program running on the computer. Thus, the character's appearance can range from a substantially normal appearance to a cartoonish appearance as desired by the operator and determined by the data collection computer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out their invention. Various modifications, however, will remain readily apparent to those skilled in the art since the generic principles of the present invention have been defined herein.

Figure 1:
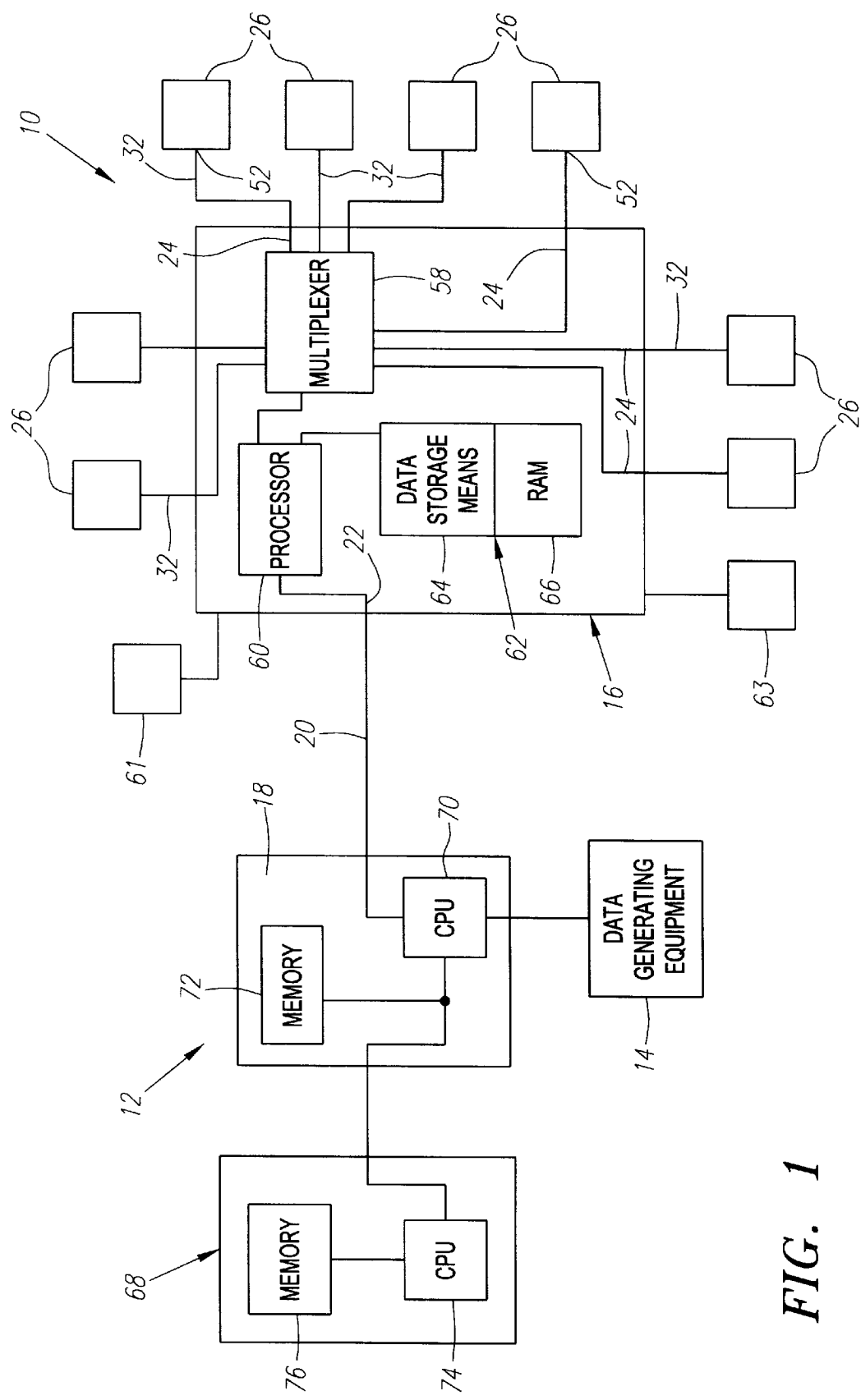
FIG. 1 is a block diagram of a system for augmenting data and for integrating the augmented data into a program running on a computer system of the preferred embodiment of the present invention.

Referring now to FIG. 1 of the drawings, there is shown generally at 10, a preferred embodiment of a system for augmenting data and for integrating the augmented data into a program running on a computer system constructed according to the principles of the present invention. The system of the present invention 10 couples to a computing system, shown generally at 12, that collects and processes data generated by the system 10 and data generated by data generating equipment 14. The data generating equipment 14, may comprise a data generating body suit, face movement tracking device, data generating glove, combinations thereof, or other and additional equipment. Preferably, the data generating equipment 14 is configured for use with the computing system 12, for integrating the data generated thereby into a data base defining a virtual world running on the computing system 12.

The system and method of the present invention 10 generates augmentation data, for augmenting movement data generated by the equipment 14. The augmentation data generated by the invented system 10 and body movement data generated by the equipment 14 can be simultaneously transmitted to the computing system 12 for augmenting and enhancing the movements of an object, such as a character, in the virtual world.

Figure 2:
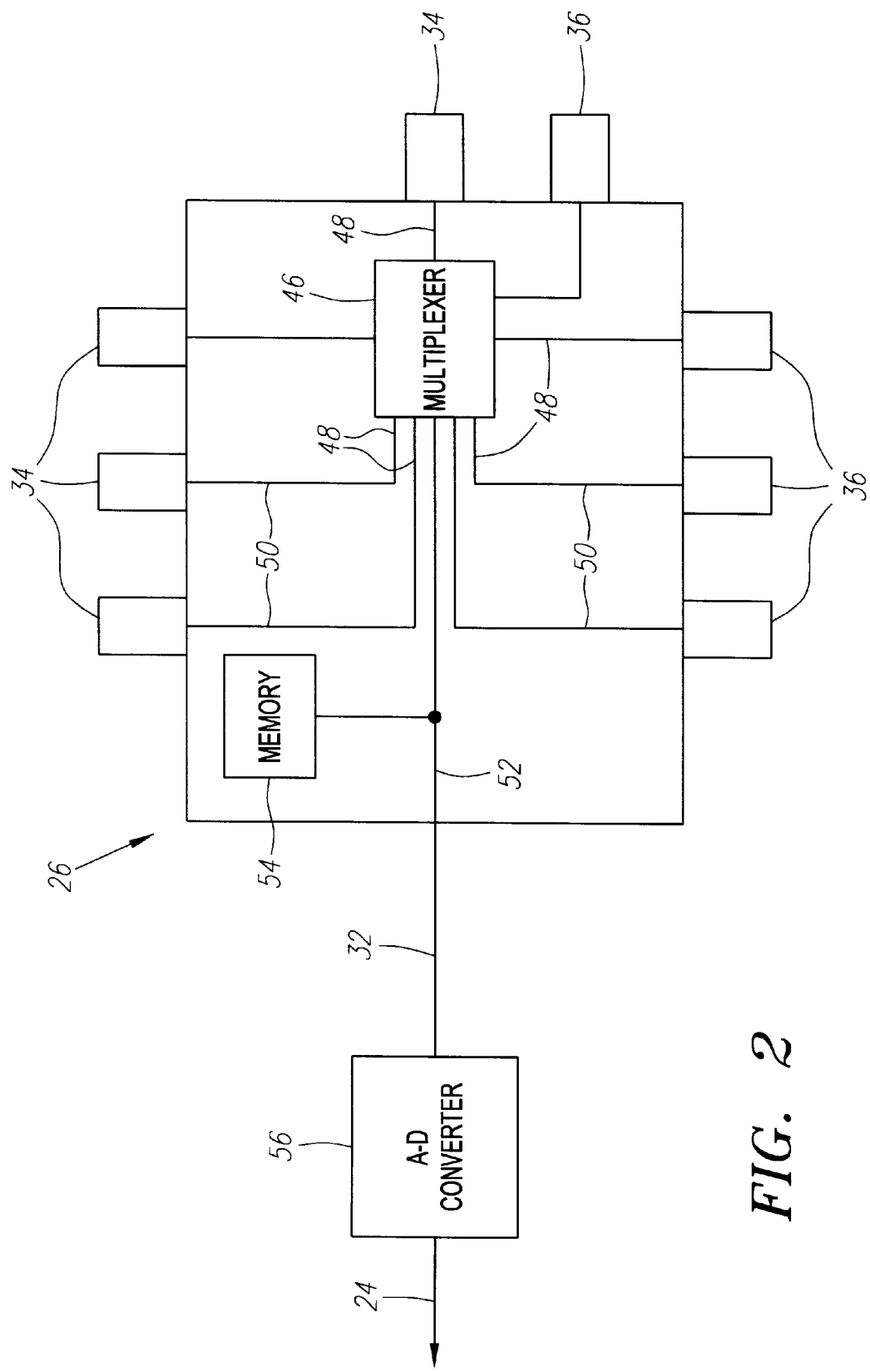
FIG. 2 is a block diagram of a peripheral device of the system of the preferred embodiment of the present invention.
Figure 3:
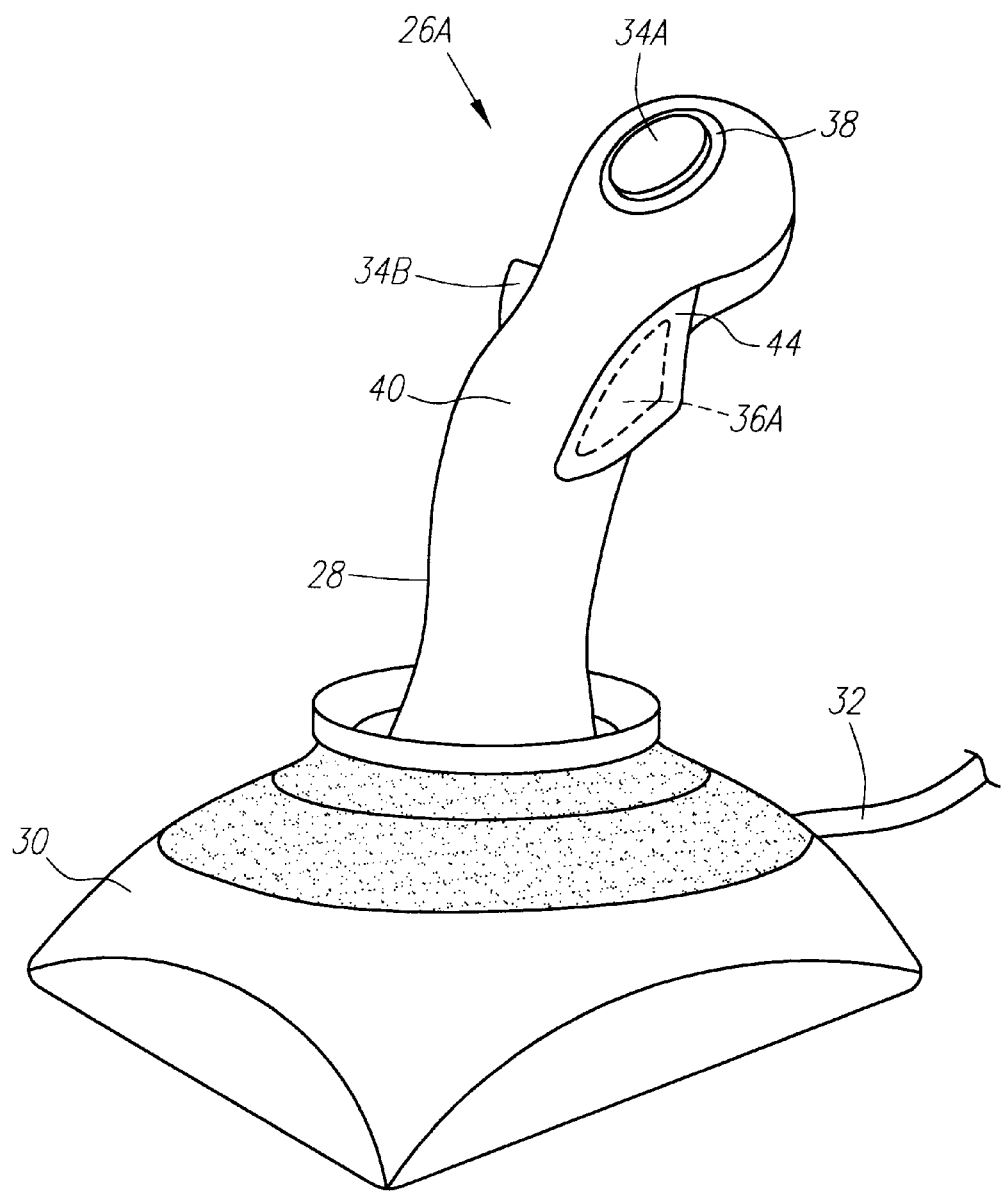
FIG. 3 is a schematic representation of the peripheral device of the system of the preferred embodiment of the present invention.

Referring to FIGS. 1–3, in the preferred embodiment of the present invention, the system 10 comprises an interface module 16 coupled to a first computer 18 of the computing system 12. The first or data collection computer 18, is coupled to the interface module 16 using known coupling means such as a serial or parallel data cable 20, or wireless transmission means. Preferably, a serial data cable 20 configured for high data transmission rates is provided for coupling the interface module 16 to the collection computer 18. The interface module 16 has an output 22 and a plurality of inputs 24. The invented module 16 may be configured with up to eight inputs 24 for coupling up to eight peripheral data generating devices 26 thereto.

The peripheral devices 26 may comprise any suitable data generating device that is configurable for use with the invented system 10. Suitable data generating devices 26 may include computer keyboards, pointing devices such as computer mice, data generating gloves, and computer joysticks. Preferably, at least one specially configured joystick 26A, along with other suitable devices comprise the peripheral devices 26 for generating signals representative of the desired augmentation data. The joystick 26A includes a handle 28, a base 30 for supporting the handle 28, and a data cable 32 for coupling the joystick 26A to the interface module 16.

The joystick 26A is provided with a plurality of different type control signal generating means preferably 34, 36 that generate specific control signals for generating augmentation data to augment a specific feature or enhance specific movements of the character. The control signals by the signal generating means 34, 36 provide such functions as calibrating the data generating equipment 14, horizontal and vertical positioning of an object such as a character or portion of a character in the virtual world, and means for augmenting the movement data generated by the equipment 14, such as controlling cartoonish or other special effects.

A first type 34 of the signal generating means comprises a momentary button or other type switch, while a second type 36 comprises a variable output switch device. In the preferred embodiment, each of the momentary switches 34 is provided for generating augmentation data that enhances or augments a selected feature or movement of the character a predetermined degree for a selected time period. The invented joystick 26A may be provided with a push button switch 34A located on an end 38 of the handle and with a second momentary switch 34B positioned in a trigger region 40 of the handle 28.

The second type signal generating means 36 may comprise known devices, such as potentiometers for instance, that are capable of generating output signals of varying amplitude. In the present invention 10, a variable output device 36A, such as a commercially available pressure sensor is positioned in a thumb grip 44 depression of the trigger region 40. As an operator (not shown) of the invented joystick 26A presses on the sensor 36A, the amplitude of signals generated thereby may increase or decrease as desired, for controlling the degree of augmentation of the augmented feature of the character. Thus, augmentation or enhancement of the predetermined feature may be only slightly enhanced, or may be enhanced greatly, to give the character a cartoon appearance or enhance the cartoonish appearance of the character, as controlled by the signals generated by the output device 36A and controllable by the operator.

Referring to FIG. 2 and FIG. 3, each of the peripheral devices 26 further includes a multiplexer means 46 for selecting activated control signal generating means 34, 36 to transmit control signals to the interface module 16. The multiplexer means 46 preferably comprises an integrated semiconductor circuit device embodying known multiplexing circuitry. The multiplexer 46 has a plurality of inputs 48 coupled to outputs 50 of the signal generating means 34, 36 and an output 52 for coupling the peripheral device 26 to an input 24 of the interface module 16.

The multiplexer 46 continuously samples its inputs 48 for sensing signals generated by activated control means 34, 36. Upon sensing activation of any of the control means 34, 36 the multiplexer 46 selects the control means 34 generating the signal, to receive signals generated thereby and transmits the signals to the interface module 16, for causing specific augmentation data to be generated. Nonvolatile memory means 54 may also be provided to retain information regarding the control means 34, 36. In the preferred embodiment, the memory means 54 comprises a known Electrically Erasable Programmable Read Only Memory (EEPROM) device and is programmed as is well known in the art. The EEPROM 54 is programmed with information that provides the collection computer 18 with the specific configuration of each control means 34, 36 and the input 48 of the multiplexer 46 that the control means 34, 36 is connected to.

Referring now to FIG. 1 and FIG. 2 of the drawings, the invented interface module 16 is coupled between the peripheral devices 26 and data collection computer 18 for receiving signals generated by the devices 26 and for transmitting data representative of the generated signals to the computer 18. An analog to digital (A-D) converter 56 is coupled between each output 52 of each peripheral device 26 and each input 24 of the module 16 for converting the analog signals generated by the control means 34, 36 of the devices 26 to digital values. The module's inputs 24 are coupled to a multiplexer 58 retained therein. The multiplexer 58 again comprises a commercially available semiconductor device and functions in a manner analogous to the multiplexer 46 provided in each of the peripheral devices 26. Accordingly, each of the plurality of multiplexer inputs 24 coupled are to the output 52 of each of the peripheral devices 26. The multiplexer 58 continuously samples its inputs 24 for sensing signals output from each of the peripheral devices 26, via the data cable 32.

Upon sensing signals generated by any of the devices 26, the multiplexer 58 selects the peripheral device 26, to receive signals generated thereby and transmit the signals to the data collection computer 18, for causing specific augmentation data to be generated. The interface module 16 also includes a processor 60, which may comprise any suitable semiconductor micro-controller device, for controlling data flow through the module 16. An analog power source 61 and a digital power source 63 are coupled to the module 16 for supplying power thereto. The analog source 61 and digital source 63 are preferably each provided to reduce noise generated by the module.

As control signals are received by the module 16 from the peripheral devices 26, via the multiplexer 58, the signals are first converted to digital values by the A-D converter 56, to prepare the signals for processing. Data indicating the control means 34, 36 that generated the control signals and its associated peripheral device 26 are grouped with the digital values of the control signals by the processor 60 to form the augmentation data. The processor 60 may also perform other desired data processing functions including digital signal level calibration and noise reduction, for example. After processing, the augmentation data may be transmitted to the data collection computer 12 for processing by the system 12.

The interface module 16 may also be provided with memory means 62 for data storage. The memory means 62 preferably includes nonvolatile data storage means 64, such as an EEPROM, and volatile data storage means 66, such as a known Random Access Memory (RAM) device. The EEPROM 64 is programmed with information that provides the collection computer 18 with the specific configuration of each of the peripheral devices 26 and the input 24 of the multiplexer 58 that the device 26 is connected to. The RAM device 66 may be provided for temporarily storing augmentation data to be transmitted to the collection computer 18.

Referring again to FIG. 1 of the drawings, in the preferred embodiment of the present invention 10, the computing system 12 comprises the data collection computer 18 coupled to the interface module 16 for receiving augmentation data therefrom and a processing computer 68 for receiving processed augmentation data from the collection computer 18. The data collection computer 18 includes a central processing unit (CPU) 70 for performing some processing on the augmentation data and a memory means 72 that may contain a processing program.

The collection computer 18 continuously receives augmentation data as it is transmitted from the interface module 16 As the augmentation data is received by the computer 18, the data is processed by first sorting the data into groups of data, with each data group representing data that is generated by a specific control means 34, 36 of a specific device 26. The processor 70 continuously sorts and organizes the data according to the control means 34, 36 that generated the data, and configures the data into data records to prepare the data for processing by the processing computer 68. The data collection computer 18 may also perform additional processing on the augmentation data, such as low-pass noise filtering or some normalization of the data.

The processing computer 68 includes a CPU 74 that performs additional processing on the sorted augmentation data records and a memory means 76 that preferably contains a data base program defining a virtual world. As the augmentation data records transmitted from the data collection computer 18 are received by the processing computer 68, the CPU 74 processes the data and integrates the data into the data base program running on the computer 68 for augmenting or enhancing the movements of an object, such as a cartoon figure or character in the virtual world. The augmentation data causes the character to have augmented, or cartoonish, type movements and characteristics, as controlled by the specific control means 34, 36 generating the control signals that generate the augmentation data.

As the data collection computer 18 is receiving augmentation data from the interface module 16, the computer 18 is also receiving movement data generated by the data generating equipment 14. Some data processing, such as noise filtering and normalization, may be performed on the movement data as it is received by the computer 18. After processing, the movement data is transmitted to the processing computer 68 for integration into the data base program running on the computer 68 for controlling the movements of the character and for augmentation of the movement data by the processed augmentation data.

Figure 4:
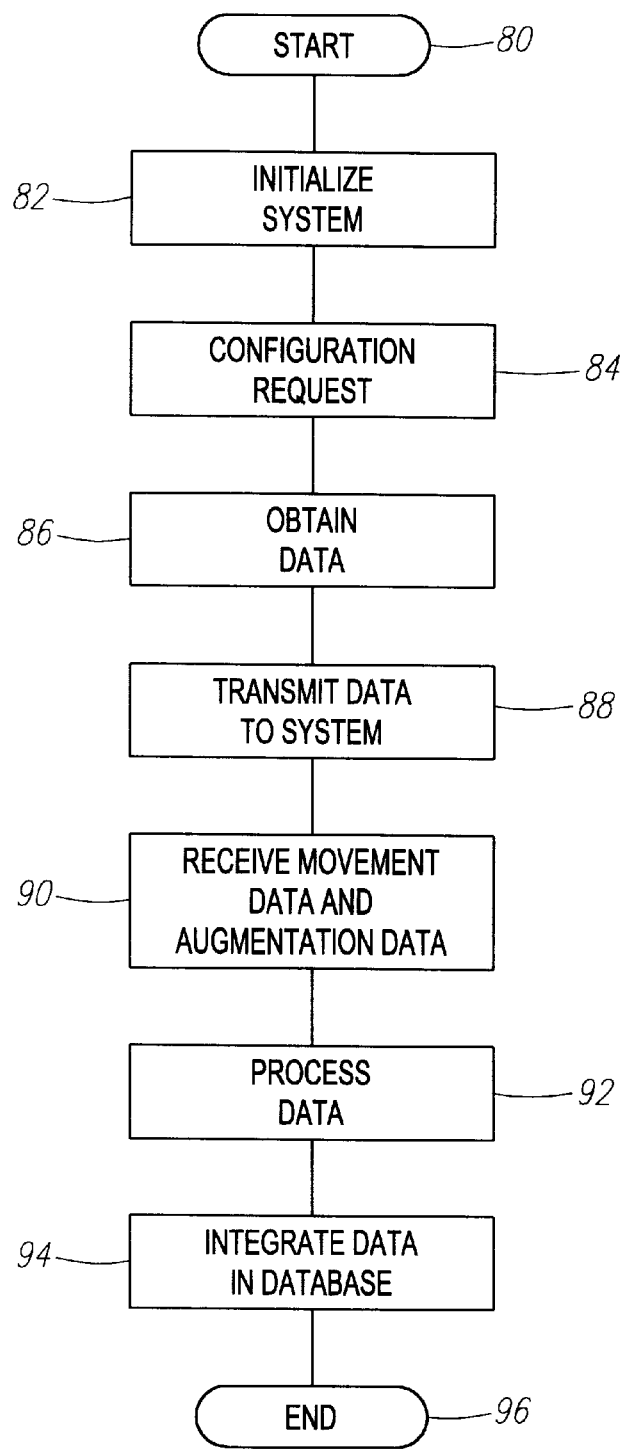
FIG. 4 is a flow diagram of a method for augmenting data and for integrating the augmented data into a program running on a computer system of the preferred embodiment of the present invention.

Referring now to FIG. 4 of the drawings, the method of the present invention is invoked in start block 80. In process block 82 the invented system 10 initially activated. Upon initial activation of the system 10, in process block 84, the computer system 12 transmits a request signal to the interface module 16 to obtain configuration and number of peripheral device information stored in the EEPROM 64 thereof. In process block 86, the module 16 transmits a request signal to each of the peripheral devices 26 for accessing the configuration information stored in each EEPROM 64 thereof. Upon receiving the configuration information from each of the peripheral devices 26 and interface module 16, the configuration information is transmitted to the computer system 12 in processes block 88. The data collection computer 18 is then prepared to receive augmentation data from the interface module 16, along with movement data output from the data generating equipment 14.

As a wearer (not shown) of the equipment begins moving about, the equipment 14 begins generating movement data, indicating the wearer's movements, and transmitting the movement data to the data collection computer 18 in process block 90. Simultaneously, in process block 90, as the movement data from the equipment 14 is received by the computer 18, an operator of the invented system 10, which could be the wearer or another person, monitors the movements of the wearer. When desired, the operator actuates a selected control means 34, 36 of one of the peripheral devices 26 to augment a desired feature or features, or facial expression, for example of the wearer.

For example, if the operator desires to augment eyebrow movement of the wearer, for causing the eyebrow to move substantially upwardly on the wearer's face to give the character a cartoonish appearance for example, the operator actuates a predetermined one, or more, of the control means 34, 36 for generating augmentation data to augment movement of the eyebrow. The control means 34, 36 generates control signals that are determined by the type of control means for achieving a desired augmentation of the movement data. For example, if the control means activated comprises the second type of control means 36, such as the pressure sensor 36A, the control means 36 may be incrementally activated for achieving a predetermined enhancement of eyebrows movement. Thus, movement of the eyebrow, such as raising the eyebrow may be only slightly enhanced, moving the eyebrow upwardly on the character's forehead or may be enhanced greatly, moving the character's eyebrows completely off their head to give the character a cartoon appearance, or enhance the cartoonish appearance of the character.

The augmentation data is generated for a time period determined by the type of control means 34, 36 activated and data collection computer 18, for example. If the activated control means comprises a momentary switch 34, the activation time period thereof is preferably determined by the collection computer 18. When utilizing a variable output control means 36 the activation time period thereof may be determined by the operator. The operator preferably is capable of determining the degree of augmentation of the selected feature, for adjusting the augmentation of the feature from null augmentation to full augmentation, as desired.

In process block 92, the data collection computer's processor 70 continuously sorts and organizes the data, then transmits the data to the processing computer 68. The processing computer 68 receives the data transmitted by the collection computer 18, in process block 94 for integration into the data base program running on the computer 68 for controlling the movements of the character and for augmentation of the movement data by the processed augmentation data. The augmentation data generated by activated the control means 34, 36 is continuously transmitted to the collection computer 18, the movement data generated by the equipment is simultaneously transmitted to the computer 18 for integrating the data simultaneously for altering the program running on the processing computer 68. Thus, the character's appearance can range from a substantially normal appearance to a cartoonish appearance as desired by the operator and determined by the processing computer 68. The method of the present invention terminates at end block 96.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. In a computing system including control signal generating means, interface means, data generating means, and computing means for manipulating a data base program, a method for augmenting data comprising the steps of:

activating the computing system;

transmitting a request signal to the interface means for determining the configuration of the control signal generating means for ascertaining augmentation data types generated thereby, the control signal generating means adapted to generate at least one control signal to provide a selected augmentation data type;

receiving configuration information from the control signal generating means and storing the information in a memory of the computing means;

sampling the data generating means for determining the configuration thereof and storing the configuration information in the memory;

continuously transmitting data generated by the data generating means to the computing means for processing the data to control a selected component of the data base program;

continuously monitoring the data generating means for sensing data generated thereby;

activating the control signal generating means upon sensing desired data generated by the data generating means for generating augmentation data to augment the selected component controlled by the data;

processing the augmentation data for directly modulating desired characteristics of the selected component determined by the augmentation data; and deactivating the control signal generating means for terminating augmentation of the selected component.

2. The method of claim 1 wherein the control means are selectively activated and deactivated to generate differed desired types of augmentation data for different selected time periods for augmenting control of different desired characteristics of the selected component controlled by the data generating means.

3. A system for augmenting data comprising:

computing means for data processing, the computing means including a memory means having a data base program stored therein, the data base program defining a virtual world;

a data generating device coupled to the computing means for transmitting object control data thereto for processing the data to control an object in the virtual world;

a plurality of control signal generating means for generating control signals, each of the signal generating means generating at least one selected control signal for augmenting a selected characteristic of the object; and interface means coupled to each of the signal generating means for receiving the control signals therefrom and to the computing means for transmitting augmentation data thereto, the interface means receiving control signals from the signal generating means and processing the signals for generating different groups of augmentation data determined by the received control signals, wherein the computing means continuously processes object control data received from the data generating device for controlling the object in the virtual world, the computing means receiving augmentation data from the interface means for integrating the augmentation data into the data base program and processing the augmentation data simultaneously with the object control data to directly augment selected movement characteristics of the object as the object is controlled by the object control data.

4. The system of claim 3 wherein each of the plurality of control signal generating means comprises:

a housing;

electronic circuitry retained in the housing; and at least one control signal generating device retained in the housing and coupled to the circuitry, the signal generating device activated for generating specific control signals and for transmitting the control signals to the interface means for causing the interface means to generate augmentation data to augment a specific characteristic of the object in the virtual world determined by the activated signal generating device.

5. The system of claim 4 wherein at least one of the control signal generating devices comprises a momentary switch, the switch generating a control signal and transmitting the signal to the interface means for causing the interface means to generate a selected set of augmentation data, the augmentation data augmenting a characteristic of the object for a predetermined time period and in a selected manner.

6. The system of claim 4 wherein at least one of the control signal generating devices comprises a signal generating device adapted to output control signals of varying amplitude, the signal generating device generating control signals of different desired amplitudes and transmitting the control signals to the interface module, the module generating augmentation data representative of the amplitudes the received control signals for controlling the manner of augmentation of the selected characteristic of the object and the duration that the augmentation data is generated by the interface module.

7. The system of claim 6 wherein the control signal generating device is selected from the group consisting of a pressure sensor and a potentiometer.

8. The system of claim 4 wherein at least one of the plurality of control signal generating means further comprises:

the housing comprising a joystick, the joystick provided with a plurality of different control signal generating means;

a first type of the control signal generating means comprising a momentary switch for transmitting a control signal to the interface means for causing the interface means to generate a selected set of augmentation data; and a second type of the control signal generating means comprising a signal generating device adapted to output control signals of varying amplitude for causing the interface module to generate augmentation data representative of the amplitudes of the generated control signals for controlling the manner of augmentation of the selected characteristic of the object and the duration that the augmentation data generated thereby.

9. The system of claim 3 wherein the computing means comprises:

a data collection computer coupled to the data generating means for receiving object control data therefrom and coupled to the interface module for receiving augmentation data therefrom, as the object control data is received by the data collection computer the data is continuously processed for controlling the movements of the object in the virtual world, the data collection computer processing the augmentation data received from the interface means simultaneously with the object control data for augmenting selected characteristics of the object, as the object is controlled by the control data, the data collection computer processing the data for preparing the data for manipulating the data base program; and a processing computer coupled to the data collection computer for receiving processed data therefrom, the processing computer including a memory means having the data base program stored therein and a processor for processing data received from the data collection computer for manipulating the data base, the processing computer receiving processed object control data and augmentation data from the data collection computer and integrating the data into the data base program for controlling and augmenting the movements of the object.

10. The system of claim 3 wherein the interface means comprises:

means for converting analog signals generated by the control signal generating devices to digital values, the converting means coupled to each control signal generating means;

means for selecting an activated control signal generating means and an associated activated control signal generating device for generating predetermined augmentation data and for transmitting the augmentation data to the computing means;

processing means for processing the converted control signals to generate selected augmentation data and to prepare the data for transmission to the computing means; and memory means for storing information regarding the configuration of each of the control signal generating means and for temporarily storing augmentation data.

11. The system of claim 4 wherein each of the plurality of control signal generating means further comprises memory means for storing information regarding the configuration thereof, the configuration information including information regarding the quantity of control signal generating devices embodied thereby and the specific types of each of the devices.

12. A method for augmenting data comprising the steps of:

(a) providing a computing system, the computer system comprising:

computing means for data processing, the computing means including a memory means having a data base program stored therein, the data base program defining a virtual world, a data generating device coupled to the computing means for generating object control data, a plurality of control signal generating means for generating control signals, each of the signal generating means generating at least one selected control signal, and interface means coupled to each of the signal generating means for receiving the control signals therefrom and to the computing means for transmitting data thereto, the interface means receiving control signals from the signal generating means and processing the signals for generating different groups of augmentation data determined by the control signals;

(b) activating the computing system;

(c) initializing the computer system for transmitting a request signal from the computing means to the interface means;

(d) transmitting a configuration request signal from the interface means to each of the control signal generating means for receiving configuration information therefrom, the configuration information including information regarding a quantity of control signal generating devices embodied by the signal generating means and the specific types of each of the devices, each of the control signal generating means generating specific control signals for augmenting a selected characteristic of the object in the virtual world in a selected manner, the signal generating devices transmitting the control signals to the interface means for causing the interface means to generate augmentation data for augmenting the selected characteristic of the object;

(e) receiving configuration information from the control signal generating means and storing the information in the memory means;

(f) sampling the data generating device for determining the configuration thereof and storing the configuration information in the memory means;

(g) continuously monitoring the data generating device for sensing object control data generated thereby;

(h) continuously processing received object control data for integrating the data into the data base program for controlling the movements of the selected object;

(i) activating at least one of the control signal generating devices of the control signal generating means upon sensing desired object control data being generated by the data generating device and transmitting the control signals from the activated signal generating device to the interface module;

(j) processing control signals for generating augmentation data representative of each of the control signals;

(k) transmitting the augmentation data to the computing means;

(l) processing the augmentation data simultaneously with the object control data for directly modulating at least one selected characteristic of the object in a manner determined by the augmentation data;

(m) deactivating the control signal generating devices for terminating augmentation of the selected characteristic of the object and to return control of the object to the data generating device;

(n) repeating steps (i) through (m) as desired to selectively augment selected characteristics of the object; and (o) repeating steps (g) through (n) for controlling the movements of the selected object and to augment selected characteristics of the object as desired.

13. The method of claim 12 comprising the further step of:

(a) simultaneously activating more than one of the control signal generating devices for augmenting more than one characteristic of the object as the object is controlled by the object control data.

14. The method of claim 12 wherein the computing means integrates the augmentation data into the data base in a manner that enables the object control data to control the movements of the selected object while enabling the augmentation data to enhance the movements of the characteristics of the object controlled by the object control data.

15. The method of claim 12 further comprising:

at least two objects in the virtual world being controlled by the object control data; and simultaneously activating more than one of the control signal generating devices for augmenting at least one characteristic of each of the objects controlled by the object control data.

* * * * *